United States Patent
Giannelis et al.

(10) Patent No.: US 7,148,282 B2
(45) Date of Patent: Dec. 12, 2006

(54) COMPOSITE OF HIGH MELTING POLYMER AND NANOCLAY WITH ENHANCED PROPERTIES

(75) Inventors: Emmanuel P. Giannelis, Ithaca, NY (US); Jin Zhu, New Brunswick, NJ (US); Byoungkyeu Park, Amherst, NY (US); Kyung Hoon Seo, Seoul (KR)

(73) Assignee: Cornell Research Foundations, Inc., Ithaca, NY (US)

(*) Notice: Subject to any disclaimer, the term of this patent is extended or adjusted under 35 U.S.C. 154(b) by 274 days.

(21) Appl. No.: 10/739,534

(22) Filed: Dec. 19, 2003

(65) Prior Publication Data

US 2005/0137287 A1    Jun. 23, 2005

(51) Int. Cl.
C08K 9/00 (2006.01)
C08K 9/06 (2006.01)
C08K 3/34 (2006.01)
B32B 27/36 (2006.01)
B32B 27/18 (2006.01)

(52) U.S. Cl. ............... 524/445; 524/442; 523/216; 428/412

(58) Field of Classification Search ............. 524/442, 524/445; 523/216; 428/412
See application file for complete search history.

(56) References Cited

U.S. PATENT DOCUMENTS

| | | | | |
|---|---|---|---|---|
| 3,799,799 A | * | 3/1974 | Golemba et al. | 264/110 |
| 3,870,559 A | * | 3/1975 | Cowling et al. | 428/511 |
| 4,355,167 A | * | 10/1982 | Ciccarelli | 546/255 |
| 4,582,866 A | * | 4/1986 | Shain | 524/94 |
| 5,219,611 A | | 6/1993 | Giannelis et al. | 427/162 |
| 5,260,094 A | | 11/1993 | Giannelis et al. | 427/79 |
| 5,530,052 A | * | 6/1996 | Takekoshi et al. | 524/447 |
| 5,554,670 A | * | 9/1996 | Giannelis et al. | 523/209 |
| 5,594,062 A | * | 1/1997 | Takemura et al. | 524/504 |
| 5,955,535 A | | 9/1999 | Vaia et al. | 524/791 |
| 6,034,183 A | * | 3/2000 | Okumura et al. | 525/293 |
| 6,197,849 B1 | * | 3/2001 | Zilg et al. | 523/216 |
| 6,225,374 B1 | | 5/2001 | Vaia et al. | 523/216 |
| 2001/0056136 A1 | * | 12/2001 | Hasegawa et al. | 523/205 |
| 2002/0120049 A1 | * | 8/2002 | Van Es et al. | 524/445 |
| 2003/0065087 A1 | * | 4/2003 | Nambu et al. | 524/588 |
| 2003/0171485 A1 | * | 9/2003 | Catridge et al. | 524/555 |
| 2003/0176537 A1 | * | 9/2003 | Chaiko | 523/200 |
| 2005/0065263 A1 | * | 3/2005 | Chung et al. | 524/445 |

FOREIGN PATENT DOCUMENTS

JP    07-228762    *    8/1995
JP    09255939 A    *    9/1997

OTHER PUBLICATIONS

Alexandre, Michael and Philippe Dubois. Polymer-layered nanocomposites: preparation, properties and uses of a new class of materials. 2000, Materials Science and Engineering, 28, p. 1-63.*
Krishnamoorti, Ramanan et al. Structure and Dynamics of Polymer-Layered Silicate Nanocomposites. 1996, American Chemical Society, Chem. Mater., 8, p. 1728-1734.*
Vaia, Richard and Emmanuel Giannelis. Polymer melt intercalation in organically-modified layered silicates: model predictions and experiment. 1997, American Chemical Society, Macromolecules, 30, p. 8000-8009.*
Lewis, Richard. Hawley's Condensed Chemical Dictionary. 2002. John Wiley & Sons, Inc. 14th edition. Online version, definitions for polycarbonate and polyester resin.*
Pinnavaia, et al. Polymer-Clay Nanocomposites. 2000. John Wiley & Sons Ltd. pp. 173-189, 207-226, 229-233.*
JPO abstract and machine translation for JP 07-228762 (p. 1-8).*
Lewis, Richard J., Sr. (2002). Hawley's Condensed Chemical Dictionary (14th Edition). John Wiley & Sons. "Melt Index".*
Nanocor Technical Bulletin on "Nanocomposites" obtained from Internet Jul. 17, 2003.

* cited by examiner

Primary Examiner—Vasu Jagannathan
Assistant Examiner—Sandra K. Poulos
(74) Attorney, Agent, or Firm—Bacon & Thomas, PLLC

(57) ABSTRACT

A composite of a polyester, e.g., a polycarbonate, and a nanoclay (layered silicate) cation exchanged with a quaternized copolymer of styrene and 2-(dimethylamine) ethyl methacrylate is provided, the composite being useful for preparing injection molded objects and after injection molding being transparent and without coloration and has enhanced modulus and strength compared to neat polyester and does not have loss of elongation and toughness compared to neat polyester.

3 Claims, No Drawings

COMPOSITE OF HIGH MELTING POLYMER AND NANOCLAY WITH ENHANCED PROPERTIES

TECHNICAL FIELD

This invention is directed at composites of high melting polymers and nanoclays.

BACKGROUND OF THE INVENTION

Nanoclays are known to be added to polymers to improve some properties of the polymers.

For this purpose, the nanoclays must be modified to be hydrophobic so as to be miscible with the polymers by conversion of the nanoclays to ammonium or phosphonium form.

Conventional ammonium form nanoclays when used to form composites with high melting polymers, while providing modest increase in modulus, because of low thermal stability begin to decompose at around 200° C. resulting in composites with significant coloration (so their use is limited to forming dark colored objects) and have poor elongation and toughness (impact resistance).

Conventional phosphonium form nanoclays when used to form composites with high melting polymers, while having acceptable thermal stability, have defective modulus and elongation properties and may be immiscible with the polymers.

SUMMARY OF THE INVENTION

It has been discovered herein that ammonium form nanoclays can be prepared that will form composites with high melting polymers that have enhanced modulus and strength without loss in elongation and toughness, and can provide formed objects which are transparent and without coloration In a first embodiment herein, these advantages are provided by a composite of polymer that requires a temperature of 200° C. or more for forming, with from 0.1 to 10% by weight of a nanoclay which has been modified to contain an ammonium cation that is stable at the temperature required for forming the polymer and which provides a modified nanoclay which is compatible (miscible) with the polymer.

In a second embodiment herein, there is provided a copolymer for use for modifying cationic form nanoclay so the nanoclay contains ammonium cation that is stable at a temperature of at least 200° and is miscible with high melting polymers. In one case the copolymer has the structure:

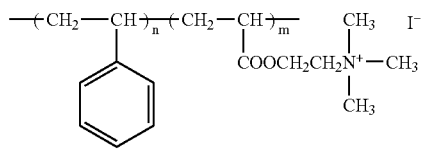

where n ranges from 10 to 200 and m ranges from 1 to 5.

In a third embodiment herein, there is provided a 2:1 layered silicate that is modified to contain organic cation which is

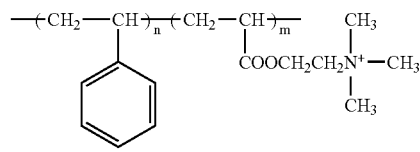

where n ranges from 10 to 200 and m ranges from 1 to 5.

The exemplified case of the second embodiment is useful to modify cation form 2:1 layered silicate to provide the third embodiment.

DETAILED DESCRIPTION

We turn now to the first embodiment of the invention herein.

The polymer requires a temperature of 200° C. or more for forming. This polymer can be, for example, a polycarbonate or other polyester. A polycarbonate of melt index of 10–12 grams/10 minutes, commercially available from Aldrich Chemical Company, is used in the working example herein.

Nanoclays are known as nanoclays because of 1 nanometer spacing between layers. The modified nanoclays herein are 2:1 layered silicates modified to contain an ammonium cation that is stable at the temperature required for forming the polymer and which provides a modified nanoclay which is compatible (miscible) with the polymer.

The term "2:1 layered silicates" is a known term and describes silicates containing lattice layers containing two tetrahedral sheets that share an edge with an octahedral sheet of either aluminum or magnesium hydroxide. The stacking of the layers provides interlayers or galleries between the layers. The galleries are normally occupied by cations that balance the charge deficiency that is generated by the isoporphous substitution within the layers. Besides the charge-balancing cations, water is also present in the galleries where it tends to associate with the cations. The silicates may be referred to as gallery-containing to describe this characteristic of 2:1 layered silicates which allows for intercalation therein of polymers. The silicates may be either natural or synthetic. The natural silicates include, for example, smectite clay minerals (e.g., montmorillonite, saponite, beidellite, nontronite, hectorite and stevensite), vermiculite and halloysite. The synthetic silicates include, for example, laponite, fluoromica, fluorohectorite, hydroxyl hectorite, boron fluophlogopite, hydroxyl boron phlogopite, and solid solutions among those and between those and structurally compatible natural silicates selected from the group consisting of talc, fluorotalc, polylithionite, fluoropolylithionite, phlogapite, and fluorophlogopite. These normally are associated with, i.e., in the pristine state contain, charge balancing cations selected from the group consisting of sodium ions, potassium ions, lithium ions, calcium ions and magnesium ions. The 2:1 layered silicate preferably has a cation exchange capacity of 60–190 meq/100 grams. To provide the modified nanoclays herein, charge-balancing ammonium cation that is stable at the temperature required for forming the polymer and which provides a modified nanoclay which is compatible (miscible) with the polymer, is exchanged for those that are normally associated with the nanoclays. The exchange constitutes ion exchange and may be carried out as taught in Okada et al. U.S. Pat. No. 4,739,007, Okada et al. U.S. Pat.

No. 4,894,411 or Kawasumi et al. U.S. Pat. No. 4,810,734. Suitable exchange may be carried out, for example, by suspending the clay in a solution of modifying agent or by passing solution of modifying agent through a column containing the nanoclay in particulate form. Suitable exchange in the specific case of the working example is carried out by dispensing particulate clay into a coater containing solvent for the modifying agent, adding the modifying agent to form a solution of the modifying agent in admixture with the particulate clay, with the admixture at 50° C. mixing to form a suspension of the clay in the solution, then recovering the modified clay and washing and drying. A suitable modifying quaternary ammonium salt to provide modified nanoclay herein is that of the second embodiment herein. A modified 2:1 layered silicate where the cation is stable at a temperature for forming the polymer and which is compatible (miscible) with the polymer is where, for example, the modification is to convert pristine cationic form silicate to quaternary ammonium form where the quaternary ammonium substituent is quaternized copolymer of styrene and 2-(dimethylamine) ethyl methacrylate. Preferably, the modified 2:1 layered silicate is the modified 2:1 layered silicate of the third embodiment herein.

The composite of the first embodiment is readily prepared by melting the polymer and blending the melted polymer with modified nanoclay, e.g., ground to through 250 mesh, in an extruder whereby extruded product is constituted of the composite.

We turn now to the third embodiment which is directed to a 2:1 layered silicate modified to contain the organic cation

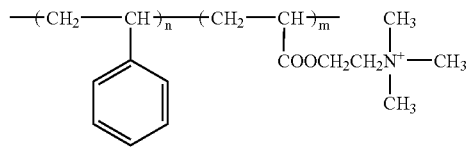

where n ranges from 10 to 200 and m ranges from 1 to 5. 2:1 Layered silicates so modified in the working example herein are montmorillonite and fluoromica. Modification is carried out by ion exchange with the composition of the second embodiment.

The copolymer of the second embodiment has the structure

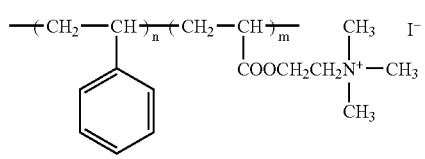

where n ranges from 10 to 200 and m ranges from 1 to 5.

The copolymer of the second embodiment can be prepared from styrene and 2-(dimethylamine) ethyl methacrylate by reacting these in the presence of a vinyl polymerization catalyst, e.g., azobisisobutyronitrile, in suitable solvent, e.g., tetrahydrofuran, e.g., at 70° C., to produce the amine corresponding th the above structure and then quaternizing with methyl iodide, e.g., in tetrahydrofuram at 60° C.

We turn now to the third embodiment which is directed to a 2,1-layered silicate modified to contain the organic cation

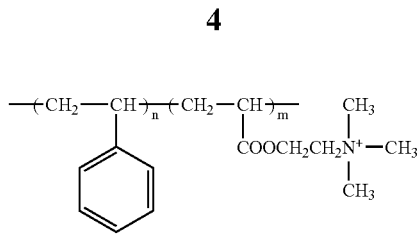

where n ranges from 10 to 200 and m ranges from 1 to 5.

2,1-Layered silicates so modified in the working example herein are montmorillonite and fluoromica. Modification is carried out by ion exchange with the composition of the second embodiment.

The invention is illustrated by the following working example:

EXAMPLE

Styrene (9.5 g) and 2-(dimethylamine) ethyl methacrylate (0.5 g) were dissolved in tetrahydrofuran together with azoisobisisobutyronitile (1 gram in 20 ml tetrahydrofuran) and the solution was heated at 70° C. overnight to cause polymerization and form

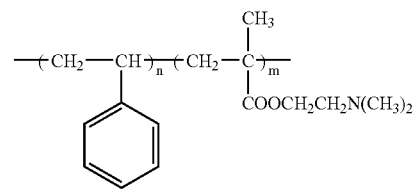

where n is 50 and m is 1. The polymerization product was quaternized using 1 gram methyl iodide (in excess) in solution in tetrahydrofuran at 60° C. for 4 hours to produce

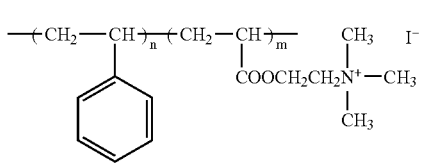

where n is 50 and m is 1.

Montmorrilonite (cationic form) and fluoromica (cationic form) was modified as described above. The montmorrilonite and fluoromica were obtained commercially. In each case a modified nanoclay was obtained where the balancing organic cation was

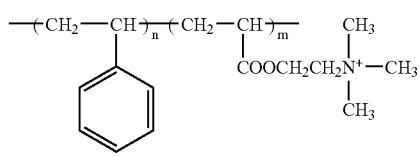

where n is 50 and m is 1.

Composites were prepared from polycarbonate of melt index of 10–12 grams/10 minutes (available from Aldrich Chemical Company) and in one case, the modified montmorillonite and in a second the modified fluoromica. In each case the composite contained 3% by weight modified nanoclay. The composites were prepared by melting the polycarbonate and blending it with modified nanoclay (ground to through 250 mesh) in a twin screw microextruder at 270° C. and 130 rpm for 5 min. This caused the polycarbonate to intercalate between layers in the modified nanoclays.

The absence of a decomposition peak in x-ray diffraction for the modified nanoclay upon blending with polycarbonate showed the modified nanoclays possess much higher thermal stability compared to conventional nanoclays. Even after injection molding the composites did not show a decomposition peak. Transmission electron microscopy images showed well dispersed hybrids were obtained (thereby demonstrating compatibility and good miscibility). Injection molded forms of the composites were transparent and without coloration.

Mechanical properties obtained on polycarbonate (PC), composite polycarbonate and 3% by weight modified montmonllonite (PCN-M) and composite of polycarbonate and 3% modified fluoromica (PCN-FM) were measured, and results are shown in the table below.

TABLE

| Sample | Modulus (GPa) | Elongation (%) | Yield Strength (Mpa) | Tensile Strength (MPa) | Toughness (Mpa) |
|---|---|---|---|---|---|
| PC | 1.3 | 150 | 62 | 73 | 80 |
| PCN-M | 1.5 | 140 | 67 | 74 | 81 |
| PCN-FM | 1.6 | 170 | 70 | 82 | 104 |

Modulus, elongation, strength and toughness were all measured by tensile testing.

The results show the composites have enhanced modulus and strength without loss of elongation and toughness.

Variations

Variations of the above will be evident to those skilled in the art. Therefore, the scope of the invention is defined by the claims.

What is claimed is:

1. A composite of a polycarbonate with a melt index ranging from 10 to 12 grams/10 minutes with from 0.1 to 10% by weight of the composite of a nanoclay, where the nanoclay is a 2:1 layered silicate that is modified to be stable at a temperature for injection molding of the composite and has a cation exchange capacity of 60–190 men/100 grams and contains as a cation a quaterized copolymer of styrene and 2-(dimethylamine)ethyl methacrylate.

2. The composite of claim 1 where the 2:1 layered silicate is montmorillonite or fluoromica.

3. A 2:1 layered silicate that is modified to contain organic cation which is

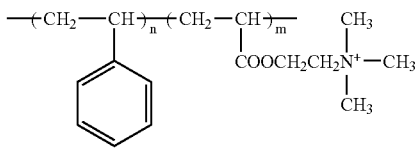

where n ranges from 10 to 200 and m ranges from 1 to 5.

* * * * *

UNITED STATES PATENT AND TRADEMARK OFFICE
CERTIFICATE OF CORRECTION

PATENT NO. : 7,148,282 B2 Page 1 of 1
APPLICATION NO. : 10/739534
DATED : December 12, 2006
INVENTOR(S) : Emmanuel P. Giannelis et al.

It is certified that error appears in the above-identified patent and that said Letters Patent is hereby corrected as shown below:

On the title page, opposite "Assignee" add: item 73

--Cheil Industries, Inc.,
Kyungsangbook-Do, Republic of Korea--.

Signed and Sealed this

Fifteenth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,148,282 B2 Page 1 of 1
APPLICATION NO. : 10/739534
DATED : December 12, 2006
INVENTOR(S) : Emmanuel P. Giannelis et al.

It is certified that error appears in the above-identified patent and that said Letters Patent is hereby corrected as shown below:

On the title page, item 73 opposite "Assignee" add:

--Cheil Industries, Inc.,
  Kyungsangbook-Do, Republic of Korea--.

Signed and Sealed this

Twenty-ninth Day of May, 2007

JON W. DUDAS
*Director of the United States Patent and Trademark Office*